US005726797A

United States Patent [19]
Zhang et al.

[11] Patent Number: 5,726,797
[45] Date of Patent: Mar. 10, 1998

[54] INFRARED NEUTRAL-DENSITY FILTER HAVING COPPER ALLOY FILM

[75] Inventors: Zhuomin M. Zhang, Gaithersburg; Raju U. Datla, Silver Spring; Leonard M. Hanssen, Gaithersburg, all of Md.

[73] Assignee: The United States of America as represented by the Secretary of Commerce, Washington, D.C.

[21] Appl. No.: 506,693

[22] Filed: Jul. 25, 1995

[51] Int. Cl.$^6$ .................................. G02B 3/00
[52] U.S. Cl. .............. 359/350; 359/888; 428/457; 428/697; 252/587
[58] Field of Search .................. 359/350, 359, 359/360, 888; 252/587; 428/457, 689, 697

[56] References Cited

U.S. PATENT DOCUMENTS

| | | | |
|---|---|---|---|
| 2,774,421 | 12/1956 | Lion | 160/238 |
| 3,731,759 | 5/1973 | Carlson | 181/0.5 |
| 4,328,068 | 5/1982 | Groth | 216/60 |
| 5,018,833 | 5/1991 | Bennett et al. | 359/888 |

Primary Examiner—Ricky D. Shafer
Assistant Examiner—Darren E. Schuberg
Attorney, Agent, or Firm—Watson, Cole, Stevens, Davis, PLLC

[57] ABSTRACT

A neutral-density optical filter has a dielectric substrate and a film consisting essentially of copper and nickel. The film is preferably formed of Constantan, which is 55% copper and 45% nickel. The filter achieves a high optical density with a low spectral variation.

13 Claims, 2 Drawing Sheets

INFRARED NEUTRAL-DENSITY FILTER HAVING COPPER ALLOY FILM

FIELD OF THE INVENTION

The invention is directed to an infrared neutral-density filter having a film of copper-nickel alloy. In the preferred embodiment, the starting material for the film is Constantan, which is an alloy of approximately 55% Cu and 45% Ni. The film after deposition consists essentially of 92–96% Cu, 2–3% Ni and 2–6% Mn. Throughout this specification percentages refer to weight, unless otherwise noted.

BACKGROUND OF THE INVENTION

Neutral-density filters are widely used in spectrophotometric and spectroradiometric application and instrumentation. These filters are called neutral-density filters because their optical density, which is defined as OD=log (1/T), where T is the transmittance, is nearly constant in the spectral region of interest.

Related art include the following references, the disclosures of which are hereby incorporated by reference in their entireties into this specification:

1. A. Frenkel and Z. M. Zhang, "Broadband High Optical Density Filters in the Infrared," *Optics Letters*, Vol. 19, pp. 1495–1497 (1994).

2. C. J. Smithells, *Metals Reference Book*, 3rd ed., Butterworths & Co., Washington, Vol. II, pp. 703 and 735 (1962).

3. L. Holland, *Vacuum Deposition of Thin Films*, Chapman & Hall, London (1956).

4. Z. M. Zhang, J. J. Hsia, R. U. Datla, and L. M. Hanssen, "Radiometric Characterization of FT-IR Spectrophotometers," in *9th International Conference on Fourier Transform Spectroscopy*, J. E. Bertie and H. Wieser, eds., SPIE Vol. 2089, pp. 226–227 (1993).

These references will be cited below by bracketed numerals, e.g., [1].

Conventional neutral-density filters are made up of Inconel (an alloy of nickel, chromium, and iron) or Nichrome (an alloy of nickel and chromium) films on a dielectric substrate, such as germanium. The transmittance of filters made of Inconel or Nichrome is very flat for optical densities less than or equal to 2. For filters with optical densities greater than 2, however, the transmittance can vary by orders of magnitude.

The transmittance spectra of some commercial filters measured using a Fourier-transform infrared (FTIR) spectrometer are shown in FIG. 1 for filters having nominal OD values of 1, 2, 3, and 4. In these filters, the substrate is 0.5 mm thick polycrystalline germanium with a diameter of 25 mm.

A method of making a filter using multilayer metallic films was proposed by Frenkel and Zhang [1]. In their work, a 100 nm Nichrome film and a 20 nm palladium film were deposited on a ZnSe substrate, resulting in a filter with 3<OD<3.7 over a 2–19 μm wavelength region.

SUMMARY OF THE INVENTION

It is an object of the invention to develop a neutral-density optical filter in the spectral region from 2 to 25 μm or beyond with high attenuation (low transmittance).

It is a further object of the invention to develop such a neutral-density optical filter for spectroradiometric application and instrumentation.

To these and other ends, the filter according to the present invention includes a film on a dielectric substrate. The starting material for the film is preferably an alloy called Constantan, which has 55% copper and 45% nickel by weight, and is preferably deposited on the dielectric substrate by a vacuum thermal evaporation process using either an electrical resistive heater or an electron beam source. A neutral-density optical filter with an optical density of 3 or 4 can be achieved.

Constantan is a thermoelectric material and is commonly used for temperature measurements. It is also widely used to make standard resistors because its electrical resistivity varies little with temperature. However, it has not been used as an optical coating material for infrared filters.

BRIEF DESCRIPTION OF THE DRAWINGS

The preferred embodiment will now be described with reference to the drawings, in which.

DETAILED DESCRIPTION OF THE PREFERRED EMBODIMENT

Figure 2A:
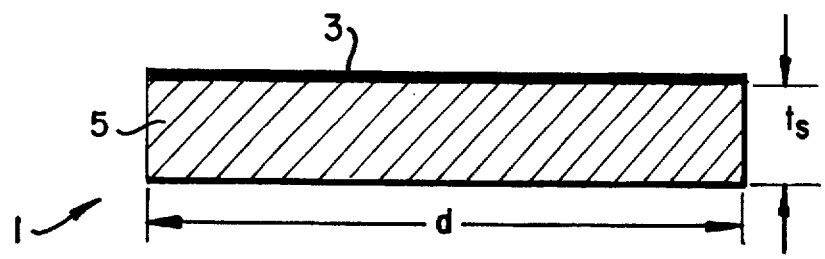
FIGS. 2A and 2B show side and top views, respectively, of a filter according to the present invention.
Figure 2B:
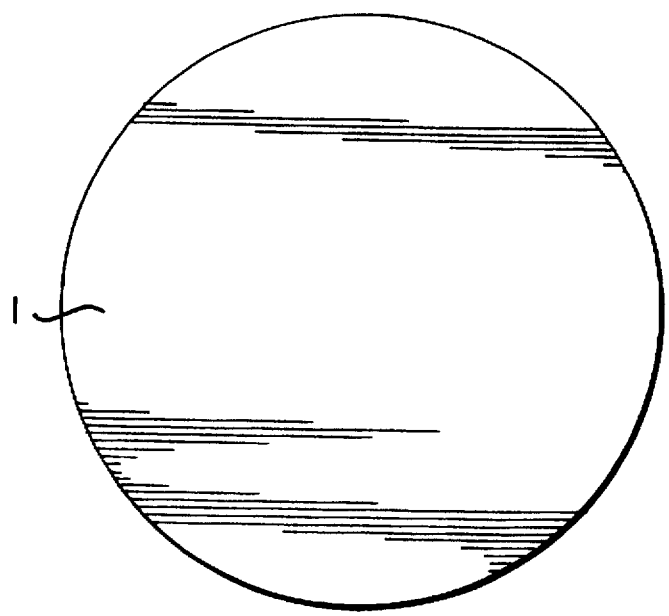

FIGS. 2A and 2B show the filter according to the present invention. As seen in these figures, filter 1 includes the alloy film 3 on substrate 5. In a preferable embodiment, the substrate has a thickness $t_s$=80–500 μm and a diameter d=approximately 25 mm. The film has a thickness $t_f$ on the order of 100 nm.

Film 3 is preferably produced from Constantan wire by a deposition process to be described below. The wire used by the inventors is from Omega Engineering, Inc., Model SPCI-032. It consists of approximately 55% Cu and about 45% Ni with less than 0.5% other materials such as Fe and Mn. (Unless otherwise expressly set forth herein, all percentages in the specification, claims and abstract are "by weight.") The selection of the form of the alloy and manufacturer thereof should not affect the results of the deposition. Alternatively, the film may be produced by co-depositing single-element Cu, Ni and Mn in the right proportions or by depositing many thin metal layers in alternation to obtain the desired composition and thickness. Those skilled in the art who have reviewed this specification will readily appreciate the variety of ways in which the filter according to the present invention can be made.

Substrate 5 is preferably a single-crystal silicon substrate with a diameter of 25 mm. The thickness varies from 80–500 μm. The filter can be made on a different substrate, such as germanium, ZnSe, or CdTe, or on a substrate having a different diameter. The substrate should be transparent in the wavelength region of interest, and its surfaces should be flat and parallel to each other.

As noted above, a physical vapor deposition process is preferably used to form the film. The Constantan wire is curled and placed in a boat made of tungsten or molybdenum. Silicon substrates are mounted on a rotatable plate above the boat inside a high vacuum chamber. The alloy is thermally evaporated by either an electrical resistive heating or an electron beam gun. The vaporized material strikes the substrate and forms a thin film [3]. The film thickness is monitored by a quartz thickness monitor. The rate of deposition is approximately 0.5 nm/s. although greater or less rates of deposition are operable. The film thickness is also measured using surface profilometers (Talystep I and Sloan Dektak II) after the deposition. Other deposition techniques that yield optical quality thin films can also be used, for example, ion-assisted deposition and radio frequency (RF) sputtering.

A Fourier-transform infrared (FTIR) spectrometer is used to measure the filter transmittance from 2 to 25 µm. A substitution method is used in order to improve the signal-to-noise ratio [4]. A $CO_2$ laser measurement at 10.6 µm was performed using filters on ultrathin substrates [1], and the results agree with FTIR measurements within 1% in OD. The spectral resolution is chosen to be 8 $cm^{-1}$ for thick substrates and is reduced to 32 $cm^{-1}$ for the 80 µm Si substrates. The use of higher resolution will reveal interference fringes caused by multiple reflections at the substrate surfaces.

The composition of the alloy before and after deposition were measured by proton-induced X-ray emission spectroscopy. The wire before deposition had a composition of 55% Cu, 45% Ni, and less than 0.5% Mn. The film after deposition was composed of 92–96% Cu, 2–3% Ni, and 2–6% Mn.

Figure 1:
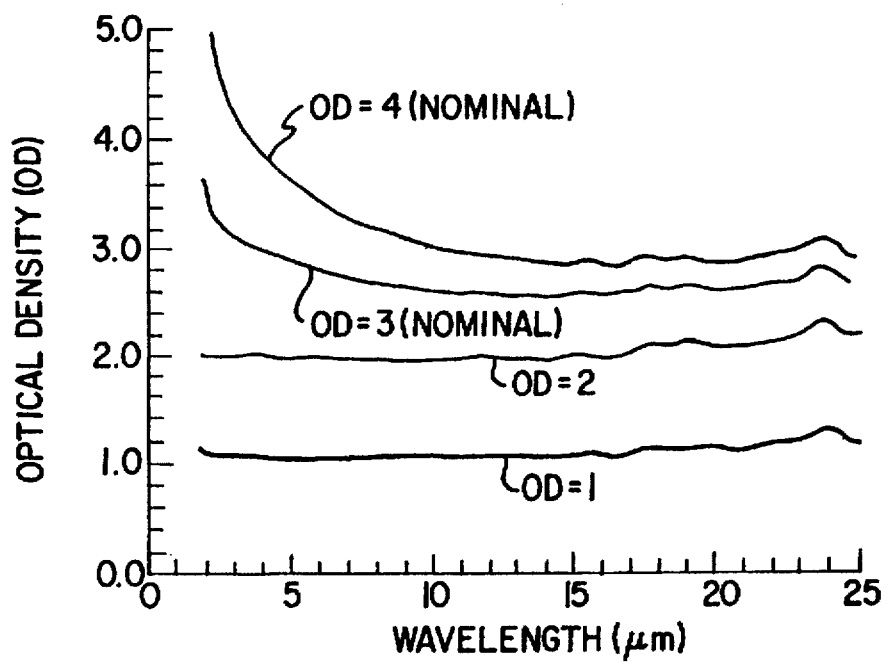
FIG. 1 shows transmittances for four filters of the prior art using Inconel films.
Figure 3:
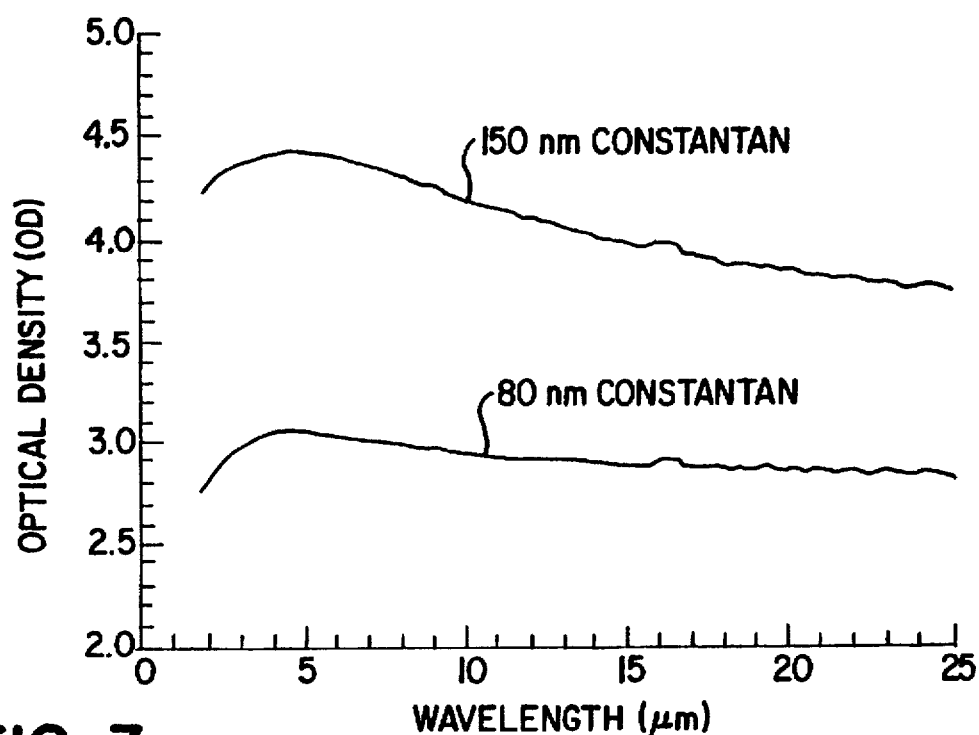
FIG. 3 shows transmittances for two embodiments of a filter according to the present invention.

FIG. 3 shows the transmittance spectra of two filters made of the Cu-based alloy films on silicon substrates. For each of these filters, the substrate is approximately 80 µm thick single-crystal silicon with a diameter of 25 mm. One filter has a 150 nm thick film of the alloy and provides an OD of 4, while the other has an 80 nm thick film of the alloy and provides an OD of 3. The optical density variation in the measured spectral region from 2 to 25 µm is less than 0.4 for the OD=3 filter and 0.8 for the OD=4 filter, respectively. For optical densities greater than two, Constantan is a better choice of material than conventionally used ones.

The neutrality of the transmittance can be improved further by using correction layers or by adjusting the relative composition of copper and nickel. Filters of OD greater than four with a variation of less than one can be made using copper-nickel films. A thin dielectric layer, such as $SiO_2$, may be deposited on top of the alloy film to protect it from oxidation.

This invention preferably employs a well-known material, Constantan, and a well-established technique, vacuum thermal deposition, to fabricate a special type of infrared filter, the neutral density filter. The advantages of using Constantan over conventionally used materials have been demonstrated by construction of neutral density filters and spectral transmittance measurements. The application of Constantan as an optical coating material is a new concept, and the commercial potential of high OD neutral density filters is significant.

The above examples are meant to be illustrative rather than limiting. Those skilled in the art who have reviewed this specification will readily appreciate that modifications such as those noted above may be made without departing from the scope of the invention.

We claim:

1. A neutral-density optical filter comprising:
 a dielectric substrate comprising single-crystal silicon; and
 a film on the dielectric substrate, the film comprising copper and nickel.

2. A neutral-density optical filter as in claim 1, wherein the film further comprises manganese.

3. A neutral-density optical filter as in claim 2, wherein the film consists essentially of 92–96% by weight copper, 2–3% by weight nickel, and 2–6% by weight manganese.

4. A neutral-density optical filter as in claim 3, wherein the film thickness is on the order of 100 nm.

5. A neutral-density optical filter as in claim 4, wherein the single-crystal silicon has a thickness of 80–500 µm.

6. A neutral-density optical filter as in claim 5, wherein the optical density is greater than 2.7 in a wavelength range of 2 to 25 µm.

7. A neutral-density optical filter as in claim 6, wherein the optical density is less than 3.1 in the wavelength range of 2 to 25 µm.

8. A neutral-density optical filter as in claim 5, wherein the optical density is greater than 3.7 in a wavelength range of 2 to 25 µm.

9. A neutral-density optical filter as in claim 8, wherein the optical density is less than 4.5 in the wavelength range of 2 to 25 µm.

10. A neutral-density optical filter comprising:
 a dielectric substrate; and
 a film on the dielectric substrate, the film comprising copper and nickel;
 wherein the optical density is greater than 2.7 in a wavelength range from 2 to 25 µm.

11. A method of making a neutral-density optical filter, the method comprising:
 (a) providing a dielectric substrate;
 (b) providing at least one metal body comprising copper and nickel; and
 (c) vapor depositing metal from the at least one metal body onto the substrate;
 wherein the neutral-density optical filter has an optical density greater than 2.7 in a wavelength range from 2 to 25 µm.

12. A neutral-density optical filter comprising:
 a dielectric substrate; and
 a film on the dielectric substrate, the film comprising copper and nickel;
 wherein the dielectric substrate is transparent in a wavelength range from 2 to 25 µm.

13. A method of making a neutral-density optical filter, the method comprising:
 (a) providing a dielectric substrate;
 (b) providing at least one metal body comprising copper and nickel; and
 (c) vapor depositing metal from the at least one metal body onto the substrate
 wherein the dielectric substrate is transparent in a wavelength range from 2 to 25 µm.

* * * * *